(12) United States Patent
Ortega et al.

(10) Patent No.: US 7,533,683 B2
(45) Date of Patent: May 19, 2009

(54) CARTRIDGE UNDERBODY ATTACHMENT

(75) Inventors: Indalecio Ortega, Lakewood, CA (US); Scott Baker, Mission Viejo, CA (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 11/651,206

(22) Filed: Jan. 9, 2007

(65) Prior Publication Data

US 2008/0163933 A1 Jul. 10, 2008

(51) Int. Cl.
*F16K 27/00* (2006.01)
(52) U.S. Cl. .............................. 137/15.18; 137/315.12; 137/454.6; 137/801
(58) Field of Classification Search ................. 137/359, 137/454.5, 454.6, 801, 15.17, 15.18, 315.12
See application file for complete search history.

(56) References Cited

U.S. PATENT DOCUMENTS

| 5,730,176 | A | 3/1998 | Heimann et al. |
| 6,058,972 | A | 5/2000 | Kahle et al. |
| 6,371,163 | B1 | 4/2002 | Kahle et al. |
| 6,718,569 | B2 * | 4/2004 | Burger et al. ............... 137/359 |
| 6,757,921 | B2 | 7/2004 | Esche |
| 7,264,016 | B2 * | 9/2007 | Molina et al. ............ 137/454.6 |

* cited by examiner

*Primary Examiner*—Kevin L Lee
(74) *Attorney, Agent, or Firm*—Richard J. Veltman; John D. DelPonti (57) ABSTRACT

The present invention is a cartridge underbody attachment for a single control faucet. The attachment generally comprises a cartridge seat, valve tubes, and tube fittings. The cartridge seat is supported within the spout body of a faucet. The spout body comprises a sideways extending port having a notch and ledge formed therein. The cartridge seat is positioned in the spout body. The cartridge seat generally comprises a backplate having defined apertures, and a manifold that is part of the rear surface of backplate. Valve tubes soldered within the manifold are in fluid communication with the apertures. A pin on the backplate interfaces with the notch in the spout body to align and position the cartridge seat within the spout body. A cartridge support housing in combination with the port ledge of the spout body secure the cartridge underbody attachment to the spout body.

12 Claims, 8 Drawing Sheets

CARTRIDGE UNDERBODY ATTACHMENT

BACKGROUND OF THE INVENTION

1. Field of the Invention

The present invention generally relates to cartridge underbody attachments for single-control type spray head faucets, and more particularly to a cartridge underbody attachment that does not utilize screws for mounting a cartridge seat within a spout body.

2. Description of the Background

There are a variety of different types of faucets, the most typical of which is known as a "widespread" faucet. This includes a spout mounted atop a countertop, and a pair of handles spaced from each other on either side of the spout. The faucet assembly also includes an underbody located beneath the countertop. A pair of valves (one hot and one cold) are located in the underbody and each valve wields a stem upwardly into the handles, which are used to control the valves and allow water to flow to the spout in a conventional manner.

Another type of faucet type is a single-control, which typically has a spout mounted atop a countertop, a single mixing valve threaded into the bottom of the spout, and a single operating lever atop the spout that is shifted to control the volume of flow as well as the mixing of hot and cold through the valve. The singe-control faucet assembly also includes an underbody. With a single-control faucet it is even easier for a user to set the volume and temperature.

Both of the foregoing as well as other prior art faucets employ underbody structures made from a number of separate parts joined together to form an operative mechanism for controlling water flow. These underbody attachments utilize various screws, washers, and other metal parts that are susceptible to corrosion and that do not effectively form a seal, which results in water leakage. Additionally, oftentimes prior art underbody faucet attachments require specially manufactured threaded parts which makes replacement of parts difficult and expensive.

For example, U.S. Pat. No. 6,757,921 issued to Esche on Jul. 6, 2004 discloses a pull-out faucet with an underbody, which comprises four separate segments permanently joined together with threaded parts, fiber and metal washers, a brass retaining ring, and bolts.

U.S. Pat. No. 5,730,176 issued to Heimann et al. on Mar. 24, 1998 discloses a housing, a valve cartridge fixed in the housing and having valve elements movable to vary rate and temperature of flow through the cartridge, and a handle connected to the valve elements. A sleeve-like casing surrounding the cartridge is rotatable on the housing and is traversed by the handle. The housing includes a collar formed with projections. The single-control mixing valve and pivotal casing are held together by a seal ring, hold-down ring, and screws.

U.S. Pat. No. 6,058,972 issued to Kahle et al. on May 9, 2000 discloses a valve body which includes a hollow, rigid housing formed with at least two outwardly open sockets and a connector body fitted in one of the sockets. A valve cartridge is secured to the connector body. A pipe extends through the housing and is provided with a nut threaded on the pipe and bearing on the plate and another nut bearing on the housing.

U.S. Pat. No. 6,371,163 issued to Kahle et al. on Apr. 16, 2002 discloses a mixing valve assembly which comprises a one piece housing, a stepped mounting sleeve, and a threaded lower end engaged in a holder inside the housing. An insert mounted on the holder is adapted to carry a valve cartridge. A mounting rod extends through the insert and is secured thereto with a threaded nut. The holder has a collar through which the rod passes and has a front face on which the insert is mounted and a pair of arms forming the holder front face. Screws engaged through the insert and threaded into the holder arms press the insert against the holder front face. A mounting structure engages the rod outside the housing to secure it down against a mounting surface.

There remains a need for a cartridge attachment where an underbody houses a valve that effectively locates and securely mounts to a spout body of a faucet, and that utilizes minimal parts and mounting geometry rather than numerous, bulky metal fasteners, and that also effectively prevents water leakage and corrosion of faucet components.

SUMMARY OF THE INVENTION

It is, therefore, an object of the present invention to provide a cartridge underbody attachment for a single-control faucet that allows installation of a valve into a spout body in a non-vertical orientation.

Another object of the present invention is to provide a cartridge attachment for a single-control faucet that utilizes minimal parts and mounting geometry for sealing and locating a cartridge seat and spout body.

Yet another object of the present invention is to provide a cartridge attachment that avoids water leakage and corrosion of components.

It is an additional object of the present invention to provide a cartridge attachment that does not utilize screws or other numerous, bulky fasteners to retain the cartridge seat within the spout body.

Still another object of the present invention is to provide a cartridge attachment that possesses a simple and scalable design.

It is yet another object of this invention to provide a cartridge attachment that is fabricated of materials providing an appropriate degree of flexibility, resiliency, durability, and longevity.

An additional object of the present invention is to provide a cartridge attachment that utilizes minimal standard components and thus may be economically manufactured and sold to provide for widespread use.

Still another object of the present invention is to provide a cartridge attachment that allows removal of a cartridge for service purposes by removing a retainer nut.

The foregoing and other objects are accomplished by a cartridge attachment for a single control kitchen faucet. The attachment generally comprises a cartridge seat, valve tubes, and tube fittings. The cartridge seat is supported within the spout body of a faucet. The spout body comprises a sideways extending port having a notch and ledge formed therein. The cartridge seat is positioned in the spout body. The cartridge seat generally comprises a backplate having defined apertures, and a manifold attached to the rear surface of backplate. Valve tubes soldered within the manifold are in fluid communication with the apertures. A pin on the backplate interfaces with the notch in the spout body to securely locate the cartridge seat, such that the seat forms an off-axis connection with a valve cartridge. A cartridge support housing in combination with the port ledge of the spout body secure the cartridge underbody attachment to the spout body.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

The present invention is a cartridge underbody attachment 3 for a kitchen faucet 2 that allows installation of a valve cartridge 7 in a non-vertical orientation into a spout body 5. The non-vertical orientation of cartridge 7 makes it possible to implement side-mounted horizontal-axis control knobs 53 as shown in FIG. 1, and also allows the valve cartridge 7 to be mounted without screws or other bulky fasteners, thereby minimizing parts and expense.

The cartridge attachment 3 for a kitchen faucet 2 according to the present invention will herein be described in the context of a single-control kitchen faucet in which the axis of control is orthogonal to the spout tube 28. However, one skilled in the art should understand that the invention may be incorporated in widespread and single-control faucets, in kitchen, bathroom or any other faucets, and the axis of control may be in any orientation relative to the spout body 5.

Figures 1, 2:
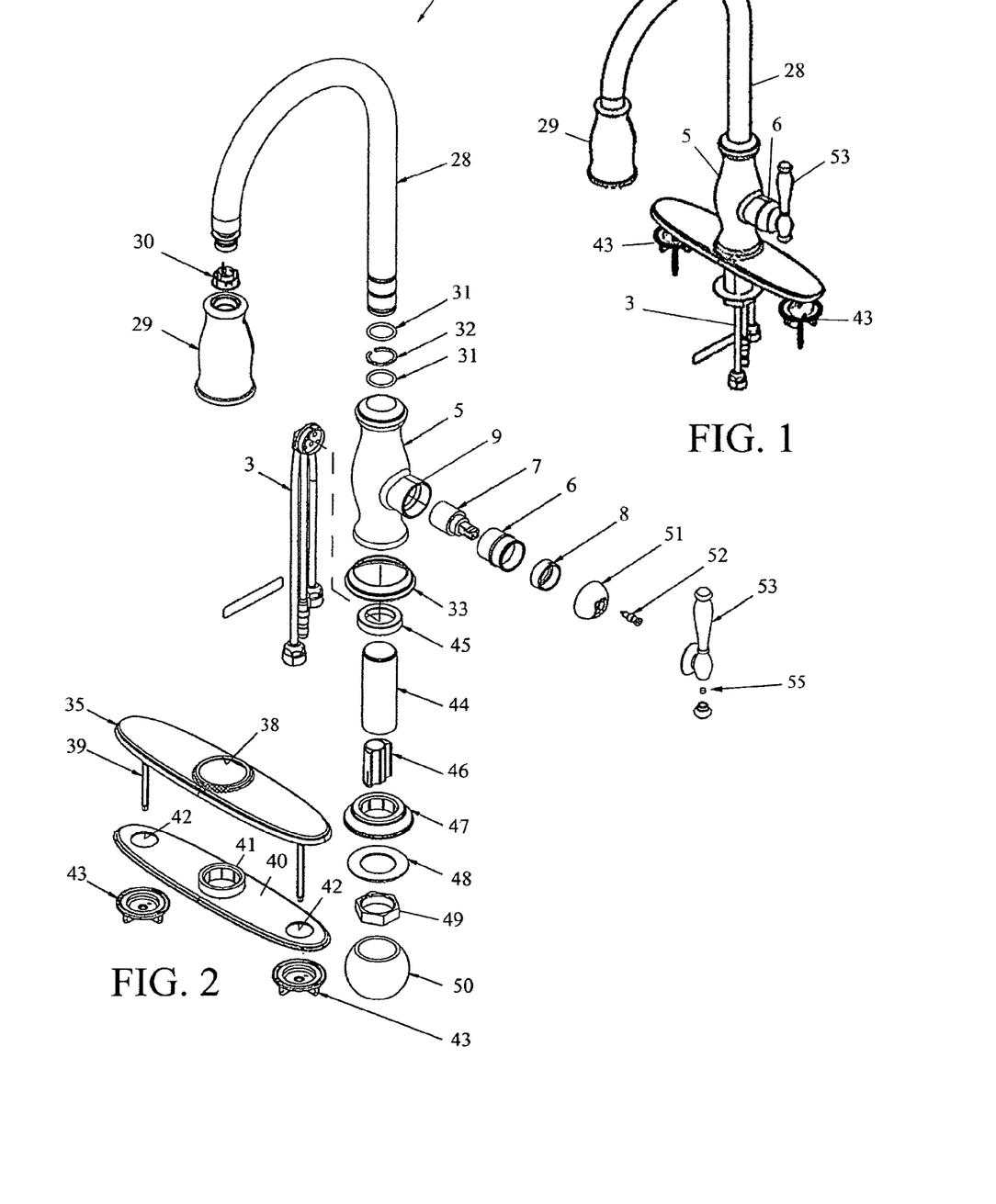
FIG. 1 is a side perspective view of a single control kitchen faucet 2 incorporating a cartridge attachment 3.
FIG. 2 is an exploded assembly drawing of the single control kitchen faucet 2 incorporating a cartridge attachment 3.

FIGS. 1-2 are a side perspective view and an exploded assembly drawing, respectively, of the single control kitchen faucet 2 incorporating a cartridge underbody attachment 3 in accordance with the present invention.

The faucet 2 generally comprises a spout tube 28 leading to a distally-attached sprayhead 29, sprayhead 29 being attached to spout tube 28 by a retainer clip 30. The spout 28 is fitted with an undercut capturing clip 32 at its other end and is positioned in a spout body 5, with a pair of O-rings 31 that produce friction and reduce wobble. The spout body 5 is seated atop an escutcheon assembly comprising a deck plate 35 or 47, the escutcheon assembly being secured to the countertop. A circular single hole mounting plate 33 centers and seats the bottom of the spout body 5 on deck plate 47. Alternatively, the deck plate 35 comprises a decorative oval plate having a central aperture 38 and downwardly-protruding threaded tie-down stems 39 attached at each end of the plate 35. The deck plate 35 is sandwiched with a putty plate 40. The putty plate 40 comprises an oval plate having a centrally defined neck 41 and an aperture 42 formed in each side of the plate 40. The aperture 38 in the deck plate 35 and the neck 41 in the putty plate 40 are aligned and dimensioned such that the deck plate 35 seats atop the putty plate 40 with neck 41 of the latter centered inside the aperture 38 of the former. The tie-down stems 39 in the deck plate 35 protrude downward and pass through the apertures 42 in the putty plate 40, and through the countertop, and are anchored there beneath by finger-nuts 43.

A fluid connection from beneath the countertop is formed by a hose guide 46 pressed into base of a mounting shank 44. A mounting washer 48 and a hexagonal nut 49 retain spout body 5 through the shank 44. Nut 45 is fitted with external threads to affix itself to the spout body 5 and shank 44. The hot and cold water hoses (not shown in FIGS. 1-2) protrude downward beyond the hose guide 46 and are coupled to a cartridge attachment 3 that extends upward into the spout body 5. The cartridge attachment 3 allows an off-axis connection to valve cartridge 7. A dome cap assembly 51 couples to support housing 6 which in turn couples spout body 5 with underbody attachment 3. Fastener 52 couple a lever assembly 53 to the valve cartridge 7. The lever assembly 53 here has an orthogonal axis of rotation to the spout body 5 and can be turned to open or close the valve 7 and mix hot and cold water therein, which water flows outward through the spout body 5 and out of the sprayhead 29. The handle of the lever assembly 53 moves left-to-right to adjust flow volume and front-to-back to adjust water temperature.

Figure 3:
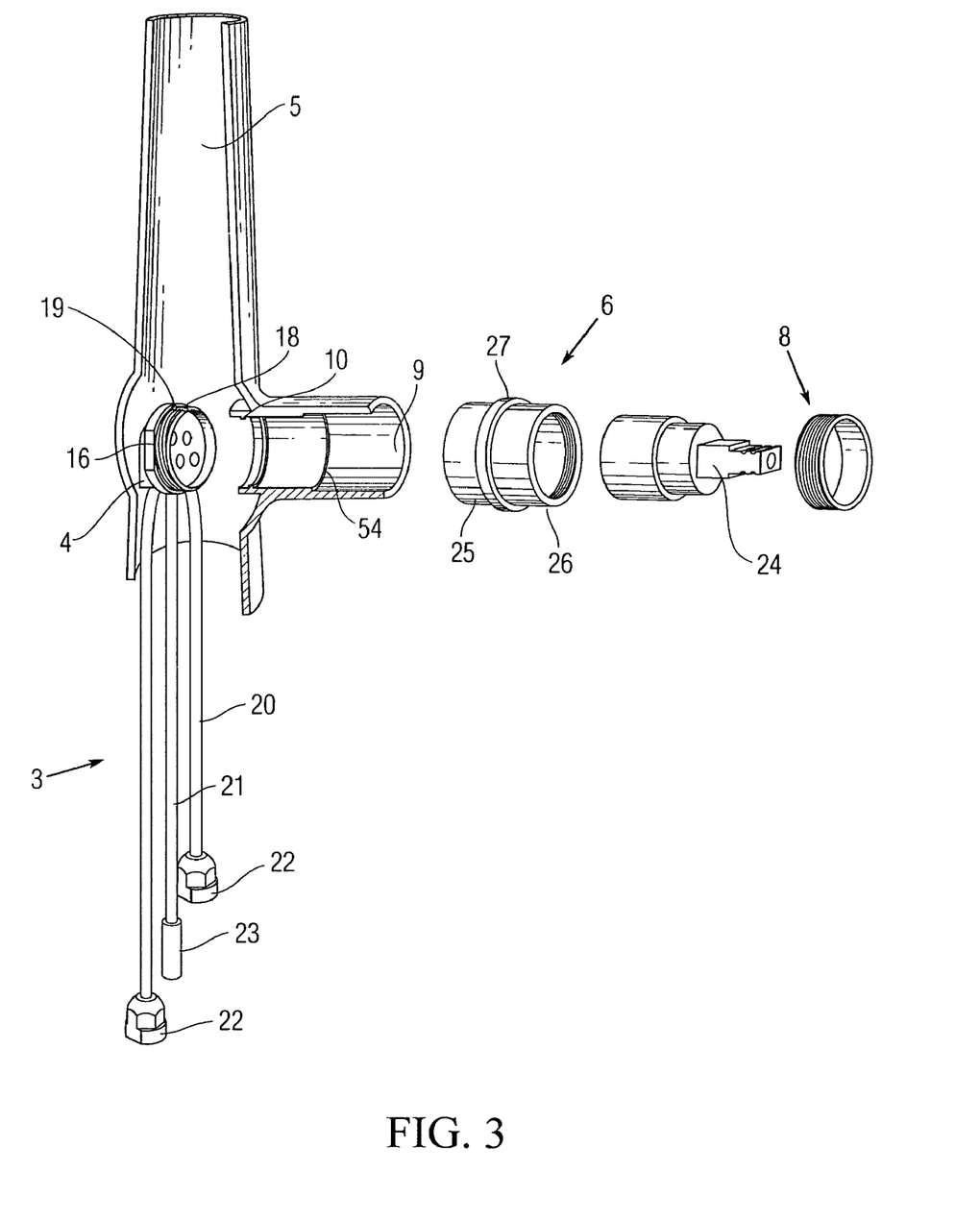
FIG. 3 is an exploded illustration of the major components of the cartridge attachment 3.

FIG. 3 is an exploded illustration of the cartridge attachment 3 which generally comprises a circular cartridge seat 4, three valve tubes 20, 21, and tube fittings 22, 23. The cartridge seat 4 is supported within the spout body 5 of a faucet 2 shown in FIGS. 1-2. A conventional valve cartridge 7 is seated against the cartridge seat 4 and is housed there by a cartridge support housing 6 and held there by a retainer nut 8 all encased within the spout body 5. The valve cartridge 7 is operated by the lever 53 (see FIG. 1) attached to stem 24 via fasteners 52, 55.

Figure 4:
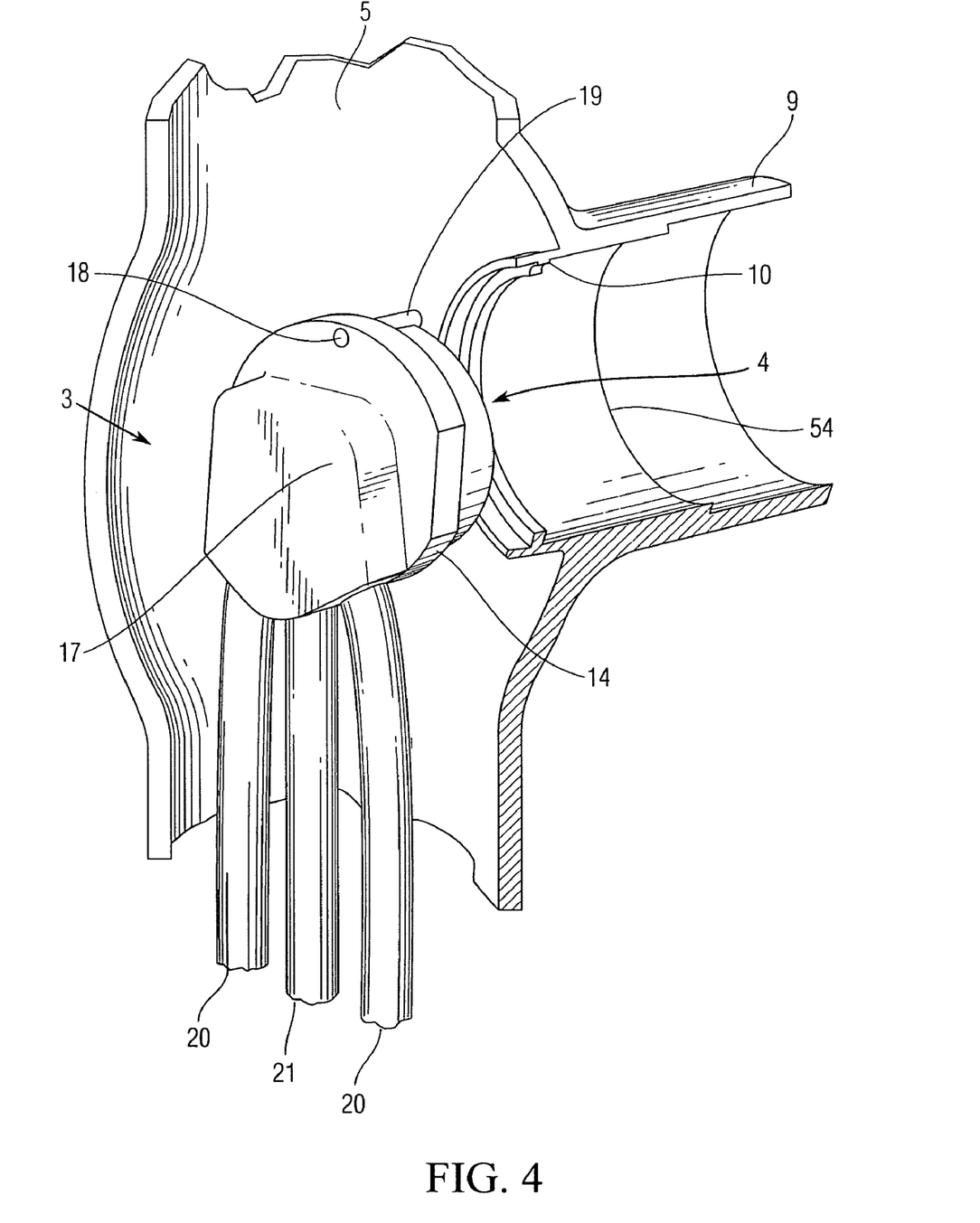
FIG. 4 is a side cut-away view of the cartridge seat 4 connected to the spout body 5.
Figure 5:
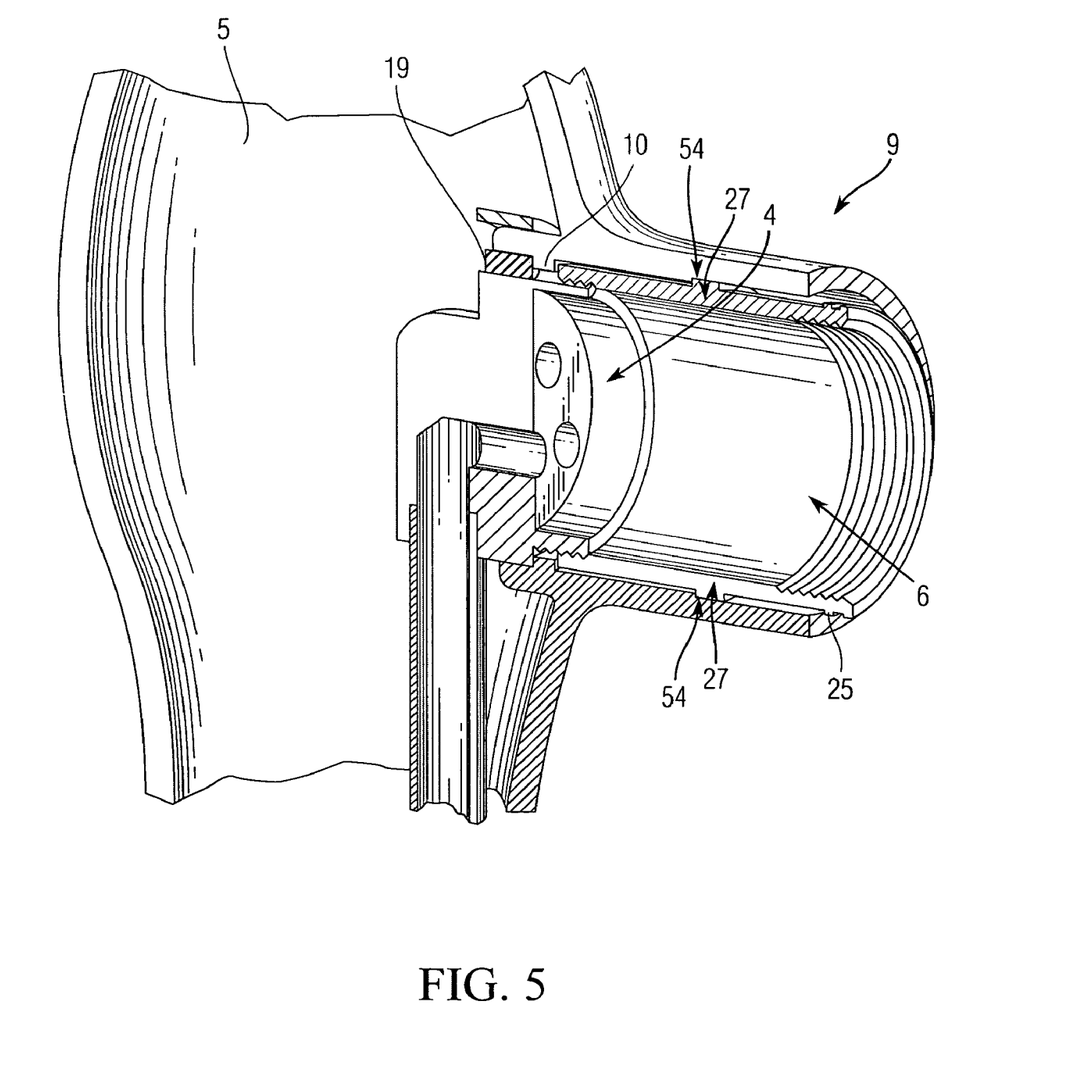
FIG. 5 is a cross-sectional view of the cartridge seat 4 connected to the spout body 5.
Figure 6:
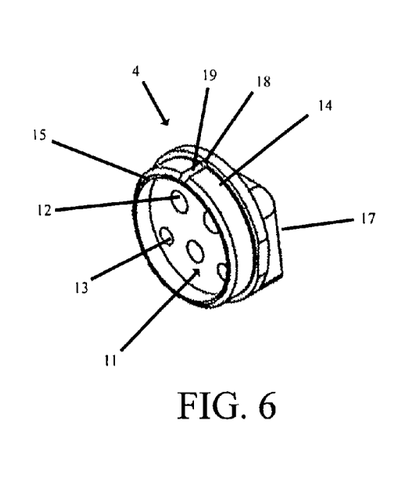
FIG. 6 is a side perspective view of the cartridge seat 4.
Figure 7:
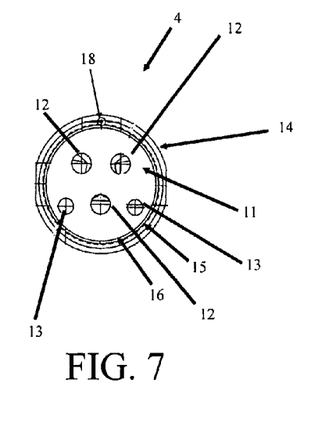
FIG. 7 is a front perspective view of the cartridge seat 4.
Figure 8:
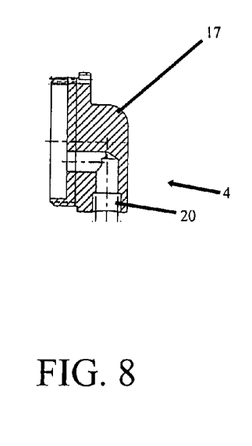
FIG. 8 is a side cross-section of the cartridge seat 4.
Figure 9:
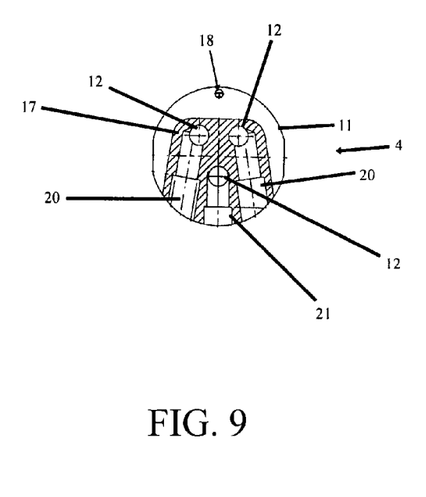
FIG. 9 is a rear cross-section view of the cartridge seat 4.

FIG. 4 is a side cut-away view, and FIG. 5 is a cross-sectional view, respectively, of the cartridge seat 4 disposed within the spout body 5. A port 9 extends sideways from the spout body 5. The cartridge support housing 6 is disposed in the port 9, and the valve cartridge 7 (not shown in FIG. 4) is inserted into the support housing 6 to form an off-axis fluid connection with the cartridge seat 4. A notch 10 is formed within the cavity of the spout body 5 at the top inside edge of the port 9, and is a stopping surface for locating the cartridge seat 4. The port 9 also includes an internal ledge 54 that serves as a stopping surface for the support housing 6 as the housing 6 threads into the seat 4.

FIGS. 6-9 are side perspective, front perspective view, side cross-section, and rear cross-section views of the cartridge seat 4. The cartridge seat 4 comprises a substantially circular backplate sealing area 11 having three large apertures 12 and two smaller apertures 13 defined therein, and a raised circular sleeve 14 surrounding the outer edge of the backplate 11 and defining a rim 15 encircling the entire sleeve 14. The rim 15 of the backplate 11 is fitted with male threads 16. A manifold 17 is part of the rear surface of the backplate 111 at a distance of approximately ½ of the radius below the top edge of the backplate 11, such that the manifold 17 communicates with the three large apertures 12. Additionally, the rear surface of the backplate 11 has a small aperture 18 defined near the top edge, through which a pin 19 is inserted. The pin 19 on the cartridge seat 4 interfaces with the notch 10 of the spout body 5; the seat 4 is thereby positively located and in position to form an off-axis connection with valve cartridge 7 which is disposed in the port 9 of spout body 5. The edges of the manifold 17 are chamfered to facilitate easier engagement with the rounded spout body 5.

Figure 10:
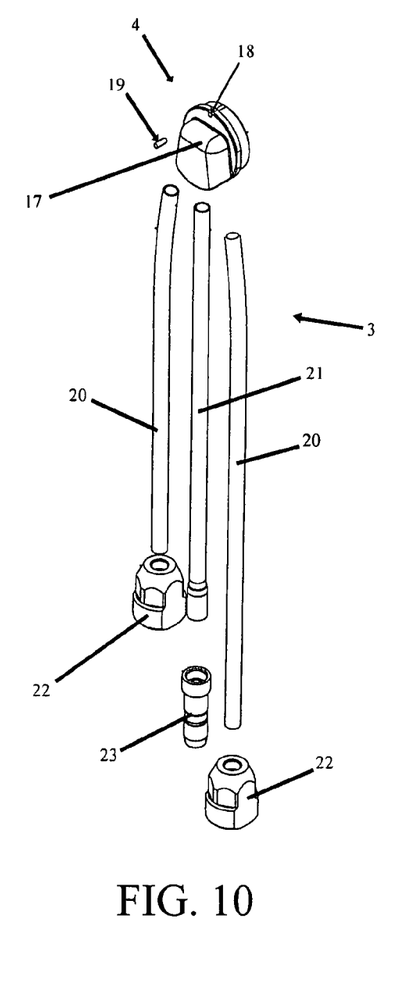
FIG. 10 is an exploded drawing of the major components of the cartridge attachment 3.
Figure 11:
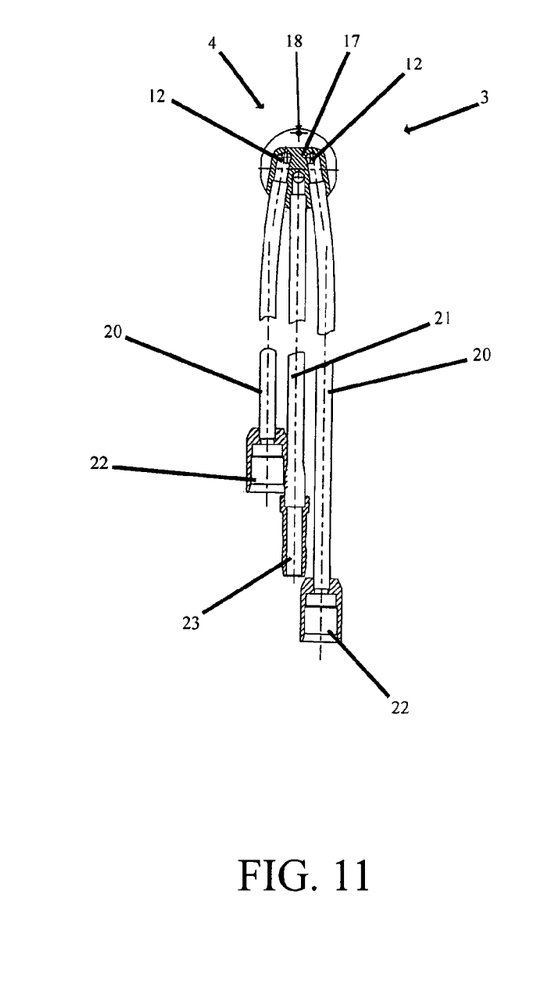
FIG. 11 is a rear cross-section of the major components of the cartridge attachment 3.

FIGS. 10-11 are an exploded drawing and rear cross-section of the cartridge attachment 3. The cartridge attachment 3 generally comprises a cartridge seat 4, three valve tubes 20, 21 and tube fittings 22, 23. The tubes 20, 21 are soldered to the interior surface of the manifold 17, such that each tube 20, 21 is in fluid communication with each of the three large apertures 12 in the backplate 11. Inlet 22 and outlet 23 fittings connect to the free ends of the inlet 20 and outlet 21 tubes, respectively for coupling to water pipes. Inverted flare, inverted expansion, or any other suitable fittings may be utilized. Valve tube 20 allows fluid to travel in, and valve tube 21 allows fluid to travel out of the cartridge seat 4 and the spout body 5. Outlet valve tube 21 connects to a flexible line (not shown) that connects to the pull-out sprayhead 29. Water passes through the valve tube 21 and out of the sprayhead 29 when the handle of the lever assembly 53 is turned from left-to-right.

The cartridge seat 4 is disposed in the hollow spout body 5, and the male threads 16 and pin 19 on the backplate 11 of the cartridge seat 4 angularly locate and mate with the notch 10 in the spout body 5. Referring back to FIGS. 3 and 4, the cartridge seat 4 is secured in place within the spout body 5. The spout body 5 is discussed in detail with reference to FIGS. 12-14 below. Once the cartridge seat 4 is positioned within the spout body 5, the cartridge 7 is inserted into cylindrical cartridge support housing 6. The cartridge support housing 6 is discussed in detail with reference to FIGS. 15-16 below. A retainer nut 8 is inserted over the extending stem 24 of the cartridge 7 to securely retain the valve cartridge 7 to the support housing 6.

Figure 12:
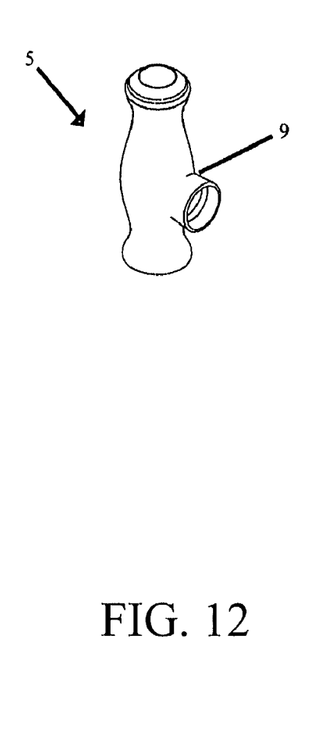
FIG. 12 is a side perspective view of the spout body 5.
Figure 13:
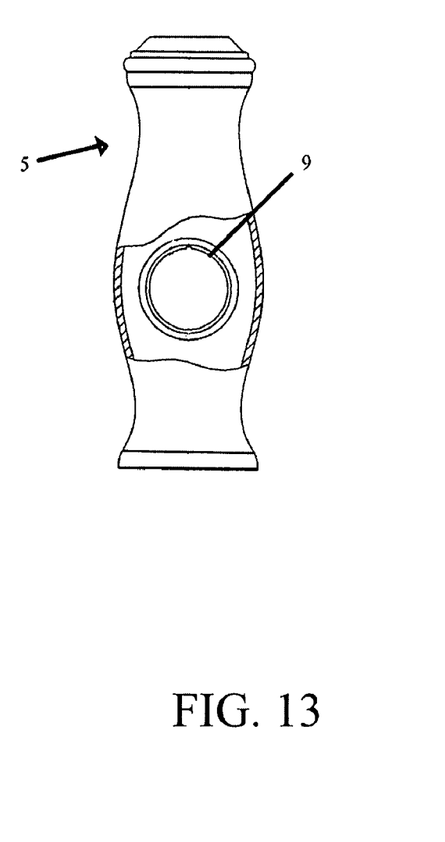
FIG. 13 is a front view of the spout body 5.
Figure 14:
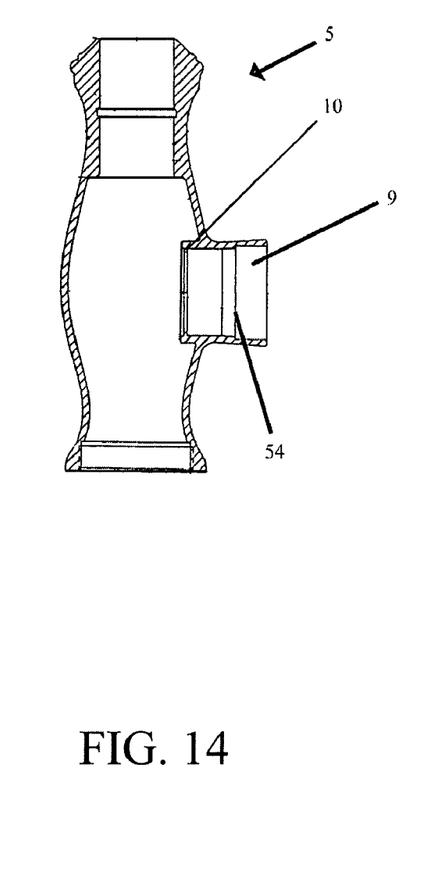
FIG. 14 is side cross-section view of the spout body 5.

FIGS. 12-14 are side perspective, front, and side cross-section views of the spout body 5. The spout body 5 extends vertically and a port 9 extends sidelong from the central portion. The diameter of the port 9 of the spout body 5 is dimensioned to fit a conventional mixing valve cartridge 7.

Figure 15:
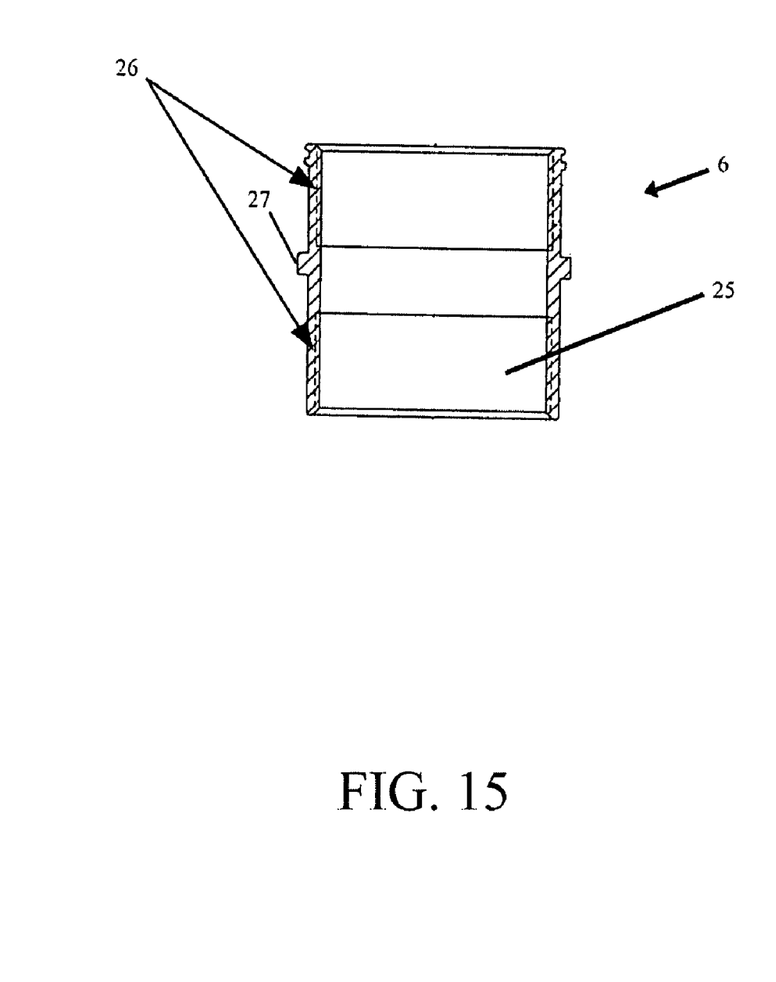
FIG. 15 is side view of the cartridge support housing 6.
Figure 16:
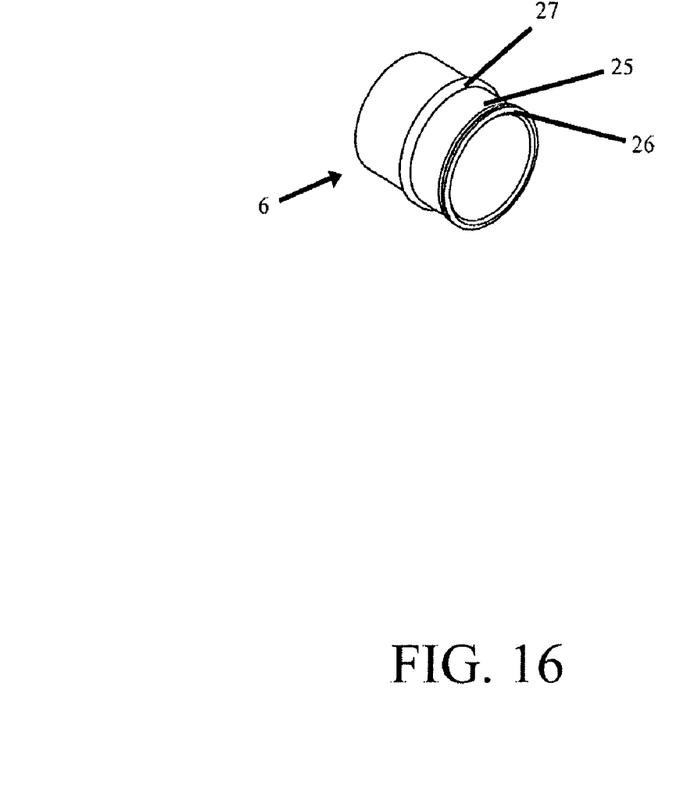
FIG. 16 is a side cross-section of the cartridge support housing 6.

FIGS. 15-16 are side and side cross-sections of the support housing 6. The support housing 6 comprises a sleeve 25 fitted with female threads 26. Additionally, a collar 27 is formed on the exterior of the sleeve 25. Female threads 26 on the support housing 6 clamp to the interior of the port 9 of spout body 5. The collar 27 of the support housing 6 rests on the ledge 54 within the port 9. Furthermore, female threads 26 on the support housing 6 couple the male threads 16 on the cartridge seat 4 that in cooperation with the ledge 54 within the port 9; secure the cartridge attachment 3 to spout body 5. The cartridge support housing 6 threads with retainer nut 8 to secure the valve cartridge 7 and the cartridge attachment 3 together at an off-axis orientation.

Having now fully set forth the preferred embodiments and certain modifications of the concept underlying the present invention, various other embodiments as well as certain variations and modifications thereto may obviously occur to those skilled in the art upon becoming familiar with the underlying concept. It is to be understood, therefore, that the invention may be practiced otherwise than as specifically set forth herein.

We claim:

1. A faucet comprising:
   a substantially vertically oriented spout body;
   a water control knob;
   a cylindrical valve cartridge oriented along a non-vertical axis; and
   a cartridge attachment for mounting said cylindrical valve cartridge in a non-vertical orientation relative to said spout body, comprising:
   a port extending along the non-vertical axis and having an internal flange;
   a cartridge seat, including,
      a backplate supported within said spout body for seating said cylindrical valve cartridge in said non-vertical orientation,
      a collar disposed in the port and configured to engage the backplate and the internal flange to retain the backplate in position,
      a manifold integral to said backplate, and
      a plurality of tubes attached to said manifold.

2. A faucet according to claim 1, wherein said backplate is formed with a circular notch and a ledge.

3. A faucet according to claim 1, said plurality of tubes comprising three valve tubes.

4. A faucet according to claim 1, further comprising a notch formed in the flange for locating said cartridge seat.

5. A faucet according to claim 1, wherein the port further comprises a cartridge support housing.

6. A faucet according to claim 5, where said flange serves as a stopping surface for said support housing.

7. A faucet according to claim 1, wherein said cartridge seat seats said cylindrical valve cartridge off-axis relative to said spout body.

8. A cartridge underbody attachment comprising:
   a cartridge seat including a backplate having a plurality of apertures, a raised sleeve along an outer edge of said backplate, and a threaded rim encircling said sleeve, said rim including a circular notch;
   a manifold fixedly attached to a rear surface of said backplate;
   a plurality of inlet and outlet tubes fixedly attached within said manifold, said tubes in fluid communication with said plurality of apertures in said backplate; and
   an aperture defined in said rear surface of said backplate and aligned with the circular notch for receiving a pin.

9. A single control faucet comprising:
   a sprayhead assembly;
   a spout body including a vertically extending body having top and bottom openings and a sideways extending port, said port comprising an internal ledge and internal notch;
   a tubular spout having a top end and a bottom end, said top end releasably connected to said sprayhead assembly and said bottom end releasably connect to said top opening of said spout body;
   an escutcheon connected to said bottom opening of said spout body;
   a valve cartridge;
   a cartridge attachment including
      a cartridge seat comprising a backplate having a plurality of apertures,
      a raised sleeve along an outer edge of said backplate, and a rim encircling said sleeve, said rim comprising male threads;
      a manifold fixedly attached to a rear surface of said backplate;
      a plurality of inlet and outlet tubes fixedly attached within said manifold, said tubes in fluid communication with said plurality of apertures in said backplate; and
      an aperture defined in said rear surface of said backplate for receiving a pin;

a cartridge support housing including a threaded sleeve, said sleeve having an exterior collar to engage said ledge of said port; and a retainer nut to secure said valve cartridge, spout body, cartridge attachment, and cartridge support housing together.

10. A method of manufacturing a faucet having a generally tubular spout body with a vertically oriented central section formed with a side-open port therein, comprising the steps of:

mounting a cartridge seat in the port from inside said tubular spout body, said cartridge seat having a manifold connected to a plurality of tubes, and a backplate for coupling a valve cartridge to said manifold, further comprising the substep of:

engaging a circular notch and a ledge formed on said backplate with a notch formed along an edge of said port and coupling a valve cartridge to the backplate of said cartridge seat such that said valve cartridge protrudes outward from said port in a non-vertical orientation with regard to said spout body.

11. A method of manufacturing a faucet according to claim 10, further comprising the steps of:

mounting a cartridge support housing inside of said port, and coupling said cartridge support housing to said backplate of said cartridge seat prior to said step of coupling a valve cartridge to the backplate.

12. A method of manufacturing a faucet according to claim 11, further comprising the step of:

coupling a retainer nut to said cartridge support housing to secure said cartridge seat within said port.

\* \* \* \* \*